United States Patent [19]
Barlow, Jr. et al.

[11] 3,919,307

[45] Nov. 11, 1975

[54] PROCESS FOR REACTING SOLID PARTICULATE MATTER WITH A GAS

[75] Inventors: Fred D. Barlow, Jr.; Joseph A. Moriarty, both of Kingsport, Tenn.

[73] Assignee: Eastman Kodak Company, Rochester, N.Y.

[22] Filed: Feb. 26, 1973

[21] Appl. No.: 335,985

[52] U.S. Cl. ............... 260/541; 260/540; 260/542
[51] Int. Cl.$^2$ ........................................ C07C 51/52
[58] Field of Search ........................... 260/540, 541

[56] References Cited
UNITED STATES PATENTS 3,654,353   4/1972   De Haas et al. .................. 260/542

*Primary Examiner*—Vivian Gardner
*Attorney, Agent, or Firm*—J. Frederick Thomsen; Daniel B. Reece, III

[57] ABSTRACT

Process for reacting a basic alkali metal salt in particulate form with a lower fatty acid in gaseous form in a fluidized bed in a manner such that a solid reaction product and gaseous reaction by-products are formed. For each mole of volatile reactant entering the fluidized bed, there is a mole of gas generated by the reaction to aid in sustaining the fluidized bed, thereby decreasing the quantity requirements for the gaseous reactants, as well as allowing use of smaller equipment.

2 Claims, 1 Drawing Figure

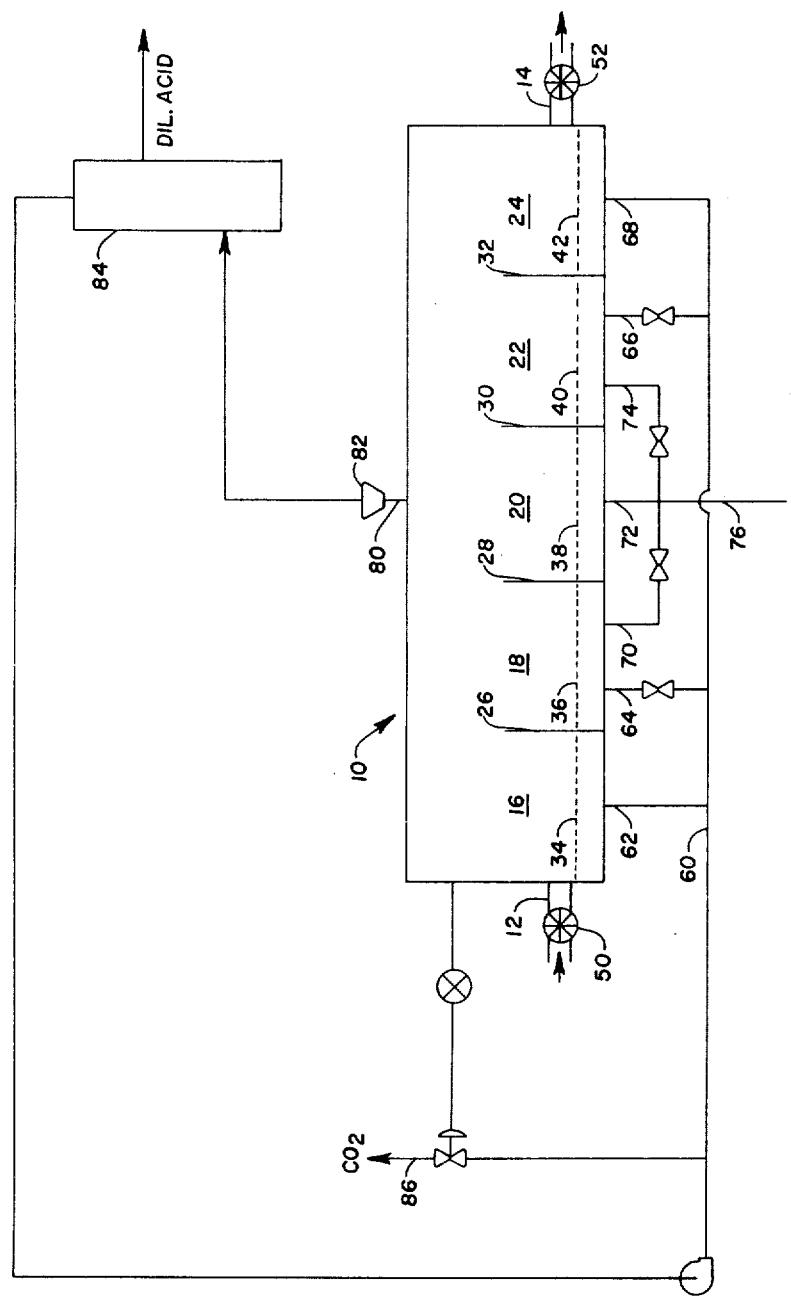

PROCESS FOR REACTING SOLID PARTICULATE MATTER WITH A GAS

This invention relates generally to a method of contacting solid and gaseous reactants to produce solid and gaseous reaction products. More specifically, this invention relates to a method of reacting a basic alkali metal salt having anionic portions capable of producing volatile components at reaction conditions upon reaction with a volatile lower fatty acid, to give a nonvolatile metal salt of the acid and a volatile by-product.

This invention is particularly applicable to the production of alkali metal salts of acetic, butyric and propionic acid, for example, in the production of sodium acetate from sodium carbonate and acetic acid. In the past, one method of carrying out such reactions has been to pass lime or other basic metal compound down a series of shelves in a reactor, while forcing acid vapors up the reactor. Such a method is disclosed in U.S. Pat. No. 662,780. The reaction, of course, occurred as contact of the solid lime was made with the gaseous acid. This reaction, however, is normally slow and incomplete. Later, such salts were produced by reacting an aqueous solution of the carbonate with an aqueous solution of the acid. The salt thus formed in aqueous solution would be recovered from the solution by crystallization or evaporation. This method involved handling large volumes of aqueous solution requiring special equipment. More recently, in U.S. Pat. No. 2,895,990 it has been suggested that sodium or potassium acetate, propionate or butyrate be produced by mixing one mole of dry, finely divided sodium or potassium carbonate or two moles of bicarbonate with at least two moles of acetic, propionic or butyric acid at a temperature within the range of just about 0°C. to below 100°C., and after the reaction mixture is throughly mixed it is heated to a temperature above 100°C. for a period of time sufficient to drive off any unreacted acid. In this process, no water or other extraneous liquid is added to the reaction mixture. This process requires the handling of liquid acids.

In accordance with the present invention, the basic alkali metal salt in particulate form is reacted with a lower fatty acid in gaseous form in a fluidized bed in a manner such that a solid reaction product and gaseous reaction by-products are formed. Only gaseous and solid phases are observed in the process. In this invention, it is important that for each mole of volatile reactant entering the fluidized bed, there is a mole of gas generated by the reaction to sustain the fluidizing reaction. Otherwise, much more of the volatile reactant and larger reactor equipment would be required to sustain the fluidized bed. For example, in the reaction of sodium carbonate with gaseous acetic acid, the following overall reaction occurs:

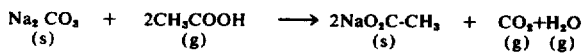

where (s) stands for "solid" and (g) stands for "gas". Thus for every two moles of acetic acid entering the reactor, one mole of carbon dioxide and one mole of steam are produced, tending to maintain fluidization by much less acetic acid than would otherwise be required.

It is therefore an object of this invention to provide a process for reacting a basic alkali metal salt having anionic portions capable of producing volatile components at reaction conditions upon reaction with a volatile lower fatty acid to give a nonvolatile metal salt of the acid and a volatile by-product.

It is another object of this invention to provide a method for reacting a basic alkali metal salt with a lower fatty acid in a fluidized bed wherein the fluidization is at least partially maintained by the reaction itself.

It is a further object of this invention to provide a process for reacting a basic alkali metal salt with a lower fatty acid wherein the yield is very high due to completeness of the reaction.

It is still a further object of this invention to provide a process for reacting a basic alkali metal salt with a volatile fatty acid wherein there is no liquid in the reactants or in the reaction products.

Further objects and advantages of this invention will be apparent from the following detailed description.

IN THE DRAWINGS

FIG. 1 is a diagrammatic view of one type of reactor suitable for use in connection with this invention.

Referring to FIG. 1, a reactor 10 is provided having solid material feed line 12 and solid material discharge line 14. The reactor may be constructed of a suitable material, such as noncorrosive sheet metal, and is essentially enclosed. It may be operated batchwise or continuously, and the embodiment shown in the drawing is particularly suitable for continuous operation. Preferably, the reactor 10 is divided into several compartments 16, 18, 20, 22, and 24 by means of baffles 26, 28, 30, and 32. The reactor 10 may be rectangular in cross-section, and be provided with supports 34, 36, 38, 40, and 42 in the compartments. These supports serve to maintain the fluidized material in the upper portion of the compartments, while maintaining distribution of gas pressure below the fluidized bed for the even flow of gas upwardly through the fluidized bed. The supports 34, 36, 38, 40, and 42 may be any porous material of screen which is capable of supporting the fluidized bed. Reinforced screen wire of about 325 mesh is suitable for this purpose. Star valves, or rotary valves 50 and 52 are provided at the inlet and outlet of the reactor in lines 12 and 14 respectively to meter solid particulate into and out of the reactor. A supply of solid reactant material is maintained in line 12 by suitable means (not shown) and means (not shown) are provided in line 14 for carrying away reacted product.

Suitable means are provided for introducing the desired gaseous material into the compartments 16, 18, 20, 22 and 24. In the reactor illustrated, it may be desirable to introduce a combination of gases into the components. For example, carbon dioxide may be introduced into compartment 16 to aid in preheating the solid reactant to the desired temperature and to initiate fluidization of the bed. Compartment 18 introduces both carbon dioxide and acid vapor into contact with the solid reactant to begin the reaction, while the major portion of the reaction occurs in compartment 20 where only acid vapor is introduced. In compartment 22, a mixture of carbon dioxide and acid vapor is again introduced to complete the reaction. Carbon dioxide introduced into compartment 24 serves to remove any acid vapor which remains in the solid reaction product.

Completely reacted product is removed by means of star value in line 14.

Suitable pipes and valves are provided by main carbon dioxide line 60 and branches 62, 64, 66, and 68 leading to compartments 16, 18, 22, and 24 respectively. Also, suitable pipes 70, 72, and 74 are provided for conducting acid vapor to compartments 18, 20, and 22 for main acid line 76. Suitable heaters (not shown) may be provided for heating the gases to the desired temperature, and the desired pressure may be maintained in these lines by conventional means.

Conduit 80 is provided at the top of the reactor for carrying away carbon dioxide and steam, the by-products of the reaction which occurs in reactor 10. A cyclone 82 may be provided, if desired, for collecting fines from the conduit 80 and either returning them back to reactor 10 or to the conduit 14. Gas, normally comprising steam, carbon dioxide, and unreacted acid vapor is separated at condenser 84, where gaseous carbon dioxide is recirculated, through line 60, and water and acid are condensed and separated by distillation. Excess carbon dioxide may be removed through line 86.

It should be understood that FIG. 1 represents one of the many potential forms which the apparatus may assume in the practice of this invention. Simple apparatus, such as a single compartment fluidized bed operated batchwise and without the aid of additional inert gas may be successfully used in carrying out the process of this invention. A great advantage derived from this invention is that surprisingly small amounts of vaporized acid are required, resulting in savings in operational, equipment and raw material costs, because the reaction at least partially maintains fluidization of the bed. It also should be understood that the reaction is fast and results in high yield as the solid reactant is maintained in particulate form throughout the reaction by the absence of liquids. The solid reactant and gaseous reactant are available for contact in an extremely efficient manner due to the large surface area presented by the particulate solid reactant. It is, of course, necessary that the temperatures and pressures in the reactor be maintained at levels such that there is no condensation of the gas on the particles or inside the reactor. Fluidized beds are discussed in detail in an article entitled "Fluidization", p. 94 of "Scientific American", Vol. 219, No. 1, 1968.

The solid reactant has been referred to herein as a basic alkali metal salt having anionic portions which are capable of producing components which are volatile at reaction conditions with the volatile lower fatty acid. This is essential to the invention as the fluidized bed is at least partly self-sustaining. The solid reactant may be an alkali metal salt such as the carbonate or bicarbonate of lithium, sodium, potassium, etc. This solid particulate material is nonvolatile at reaction conditions, and light in density. Preferably, the density is less than about 1 gram per cubic centimeter, and most desirably, less than about 0.75 gram per cubic centimeter. The particle size should be of a magnitude so that a fluidized bed may be maintained at reaction conditions. Generally, particles of up to about 590 microns are suitable, but most desirably the particles range from about 74 microns to about 250 microns. It is also preferred that the particles vary in size within this range, i.e., have good size distribution. Particles that are too small tend to blow out of the fluidized bed too easily, and particles that are too large settle out too easily.

Light soda ash from the Solvay Process is an example of a suitable, commercially available starting material.

The gaseous reactant is referred to herein as a volatile, lower fatty acid which will react with the solid reactant to give a nonvolatile metal salt of the organic acid and a volatile by-product. Either aqueous or anhydrous acids may be used. Especially suitable acids, or anhydrides, include acetic, propionic and butyric acid. The term "acid" as used herein is intended to include the anhydride of the particular acid.

Carbon dioxide is referred to herein as a useful inert gas for aiding in generating and maintaining the fluidized bed. Any other inert gas which remains a gas at the reaction temperature used may also be used, if the use of such is desired.

It is understood, of course, that it is necessary to introduce the fluidizing gases into the reactor in a direction, relative to the solid reactant, such as to establish and maintain fluidization, as is known by those skilled in the art.

The process of this invention is limited to situations where both the volatile acid and water are gases at reaction conditions. The product must be treated at temperatures and pressures above the decomposition point of sodium acetate trihydrate (120°C. at atmospheric pressure) and sodium diacetate (150°C. at atmospheric pressure) unless these materials are desired as coproducts. Should these materials be desired as coproducts, then temperatures and pressures below the decomposition point may be used.

Operating conditions can be varied in several ways to achieve desired results. Reduced pressure and lower temperatures can be used to minimize corrosion. The rate of reaction is increased if the operation conditions are below the decomposition point of sodium diacetate, since formation of the diacetate scrubs the acid vapors, but care must be taken to avoid melted sodium diacetate and caking.

The following examples are submitted for a better understanding of the invention.

EXAMPLE I

Twenty grams (0.19 mole) of sodium carbonate having a particle size of between 44 and 420 microns and density of 0.55 g/cc is charged into a glass vessel, and fluidized with a mixture of dry nitrogen and acetic acid vapor (92% assay, 8% water). Reaction conditions are atmospheric pressure and 124°C. A total of 42 g (0.7 mole) of acetic acid is added in 12 minutes. The product is then fluidized for 3 minutes in dry nitrogen at 183°C. The sodium acetate product assay is 99.6%.

EXAMPLE II

One hundred twenty eight grams (1.2 moles) of sodium carbonate having a particle size of between 44 and 420 microns and a density of 0.55 g/cc are charged into a glass vessel and fluidized with a mixture of dry nitrogen and dry acetic acid gas. Reaction conditions are atmospheric pressure and 150°C. A total of 360 g (6.0 moles) of acid are added over a period of 1 hour. The sodium acetate product is fluidized in dry nitrogen for 5 minutes to remove any residual acid vapors. The sodium acetate product assay is 99.5%, amounting to 178 g (90% of theory). The fines are not recovered.

EXAMPLE III

Thirty-three pounds (0.31 mole) of sodium carbonate having a particle size of between 44 and 420 microns and a density of 0.55 g/cc are charged into a 12-inch-diameter steel bed coated with Teflon, a fluorocarbon resin marketed by Du Pont. It is fluidized at atmospheric pressure and 185°C. with dry nitrogen, followed by fluidization by acetic acid gas. 76 Pounds (1.27 mole) of acetic acid vapors are used at a rate of 0.5 ft/sec. with 0.1 ft/sec. of nitrogen for a total of 0.6 ft/sec. The assay is 99% sodium acetate.

EXAMPLE IV

Twenty-six grams of granular potassium carbonate having a particle size of between 74 and 590 microns and a density of 1.1 g/cc are charged into the reactor described in Example I. It is dried for 15 minutes with nitrogen at 230°C. 100 ml, or 99 grams (1.33 moles) of propionic acid are added over a period of 10 minutes to an established nitrogen fluidized bed. Analysis indicates that 75% of the potassium carbonate is converted to potassium propionate. The yield is low due to density of the potassium carbonate.

EXAMPLE V

Twenty and one-half grams of sodium carbonate having a particle size of between about 250 microns and about 420 microns are charged into the reactor described in Example I. To this, 39.5 g of propionic acid are added over a period of 12 minutes to an established nitrogen fluidized bed (183°C., atmospheric pressure). Analysis indicates that 97% of the sodium carbonate is converted to sodium propionate.

Unless otherwise indicated, all percentages, ratios, proportions, etc., are by weight. Also, the term "acid" is intended to include anhydride where the acid in question has an anhydride.

Although the invention has been described in considerable detail with particular reference to certain preferred embodiments thereof, variations and modifications may be effected within the spirit and scope of the invention.

We claim:

1. The method of producing sodium acetate or potassium acetate which comprises introducing dry particles of a basic alkali metal salt selected from the group consisting of sodium or potassium carbonate or bicarbonate and having an apparent bulk density of less than about 1.0 gram per cubic centimeter into a reaction zone, introducing vaporized acetic acid into said reaction zone in a manner which tends to give said basic alkali metal salt a buoyancy within said zone, allowing said basic alkali metal salt particles and said acid vapor to react at a temperature between about 120° and about 315°C. to thereby form sodium acetate or potassium acetate and to generate at least one gaseous reaction product which creates additional buoyancy for the particles, whereby a fluid bed of particles is at least partially maintained during the reaction by at least one gaseous reaction product of said basic alkali metal salt and acid, and removing the solid, particulate sodium acetate or potassium acetate and gaseous reaction product from the reaction zone.

2. The method according to claim 1 of producing sodium acetate which comprises introducing dry particles of sodium carbonate having a size range of between about 74 and about 250 microns and an apparent bulk density of about 0.75 gram per cubic centimeter into a reaction zone, introducing vaporized acetic acid into said reaction zone in a manner which tends to give the sodium carbonate a buoyancy within said zone, allowing the sodium carbonate particles and said acid vapor to react at a temperature between 150° and 315°C. to thereby form sodium acetate and to generate at least one gaseous reaction product which creates additional buoyancy for the particles, whereby a fluid bed of particles is at least partially maintained during the reaction by at least one gaseous reaction product of the sodium carbonate and acid, and removing the solid, particulate, sodium acetate and gaseous reaction product from the reaction zone.

* * * * *